United States Patent
Beichter et al.

(10) Patent No.: US 8,655,930 B2
(45) Date of Patent: Feb. 18, 2014

(54) PROVIDING MULTI-USER ACCESS IN A SINGLE-USER BASED CLIENT-SERVER ENVIRONMENT WITH DISTRIBUTED REPOSITORIES

(75) Inventors: Friedrich Beichter, Altbach (DE); Martina Weidler, Waldenbuch (DE)

(73) Assignee: International Business Machines Corporation, Armonk, NY (US)

( * ) Notice: Subject to any disclaimer, the term of this patent is extended or adjusted under 35 U.S.C. 154(b) by 1002 days.

(21) Appl. No.: 12/303,359

(22) PCT Filed: Apr. 19, 2007

(86) PCT No.: PCT/EP2007/053830
§ 371 (c)(1),
(2), (4) Date: Dec. 3, 2008

(87) PCT Pub. No.: WO2007/141082
PCT Pub. Date: Dec. 13, 2007

(65) Prior Publication Data
US 2009/0228494 A1    Sep. 10, 2009

(30) Foreign Application Priority Data
Jun. 8, 2006 (EP) .................................. 06115112

(51) Int. Cl.
G06F 7/00 (2006.01)
G06F 17/30 (2006.01)

(52) U.S. Cl.
USPC ........................................................ 707/826

(58) Field of Classification Search
USPC .................. 707/694, 703, 704, 826
See application file for complete search history.

(56) References Cited

U.S. PATENT DOCUMENTS

| 5,257,379 | A  | * | 10/1993 | Cwiakala et al. | 713/1 |
| 5,734,909 | A  | * | 3/1998  | Bennett         | 710/200 |
| 5,978,802 | A  | * | 11/1999 | Hurvig          | 710/200 |
| 6,061,692 | A  | * | 5/2000  | Thomas et al.   | 707/613 |
| 6,301,601 | B1 | * | 10/2001 | Helland et al.  | 718/101 |
| 6,339,772 | B1 | * | 1/2002  | Klein et al.    | 707/704 |
| 6,557,082 | B1 | * | 4/2003  | Josten et al.   | 711/141 |
| 7,127,480 | B2 | * | 10/2006 | Kline et al.    | 711/162 |
| 7,689,607 | B2 | * | 3/2010  | Oks et al.      | 707/648 |
| 7,716,249 | B2 | * | 5/2010  | Harris et al.   | 707/796 |

(Continued)

FOREIGN PATENT DOCUMENTS

EP    0505791 A1    9/1992

*Primary Examiner* — Wilson Lee
*Assistant Examiner* — Mark E Hershley
(74) *Attorney, Agent, or Firm* — Grant A. Johnson; Owen J. Gamon

(57) ABSTRACT

The present invention relates to a system and a method performed in a client-server computing environment for managing the access requested by user applications (10) to a central, non-standard database type data repository (22) having proprietary access and data structures, in which data repository (22) the data integrity is controlled and checked by a further "mature" application running independently of the user applications (10). In order to provide an improved, cost-effective multiple-user access method, the following steps are proposed:
a) performing a first update on said data repository (22) of a first user application (10A) in a transactional form, and
b) in case a second user application (10B) requests a second update of said repository (22) during said first update transaction,
c) blocking a write access until said first update's transaction has been completed.

9 Claims, 6 Drawing Sheets

(56) References Cited

U.S. PATENT DOCUMENTS

| | | | |
|---|---|---|---|
| 7,805,423 B1* | 9/2010 | Romine et al. | 707/704 |
| 7,865,485 B2* | 1/2011 | Mullick et al. | 707/704 |
| 2004/0143640 A1* | 7/2004 | Rangan et al. | 709/212 |
| 2006/0010130 A1* | 1/2006 | Leff et al. | 707/8 |
| 2007/0101003 A1* | 5/2007 | Bhatawdekar et al. | 709/227 |

* cited by examiner

|  | PTOK=PTOK' | PTOK= PTOK' + local updates | PTOK <> PTOK' | PTOK<> PTOK' + local updates |
| --- | --- | --- | --- | --- |
| ITOK= ITOK' | No action (all config files are in sync) | Propagate local updates to master config file (all config files are in sync) | Refresh local HCM file (IODFs are in sync, master HCM file has additional physical updates) | Invoke physical update resolution dialog, then refresh local HCM file (IODFs are in sync) |
| ITOK ≠ ITOK' | Resync IODF data (HCM files are in sync) | Propagate local updates to master HCM file, resync IODF (HCM files are in sync) | Refresh local HCM file, resync IODF | Invoke physical update resolution dialog, then refresh local HCM file, resync IODF |

FIG. 6

PROVIDING MULTI-USER ACCESS IN A SINGLE-USER BASED CLIENT-SERVER ENVIRONMENT WITH DISTRIBUTED REPOSITORIES

1. BACKGROUND OF THE INVENTION 1.1. Field of the Invention

The present invention relates to networked computing, and in particular to a system and a method performed in a client-server computing environment for managing the access requested by users via an implementing application to a central, non-standard database type data repository having proprietary access and data structures, in which data repository the data integrity is controlled and checked by this application and, to which data repository other applications running independently of the data managing application must have access possibility.

1.2. Description and Disadvantages of Prior Art

Figure 1:
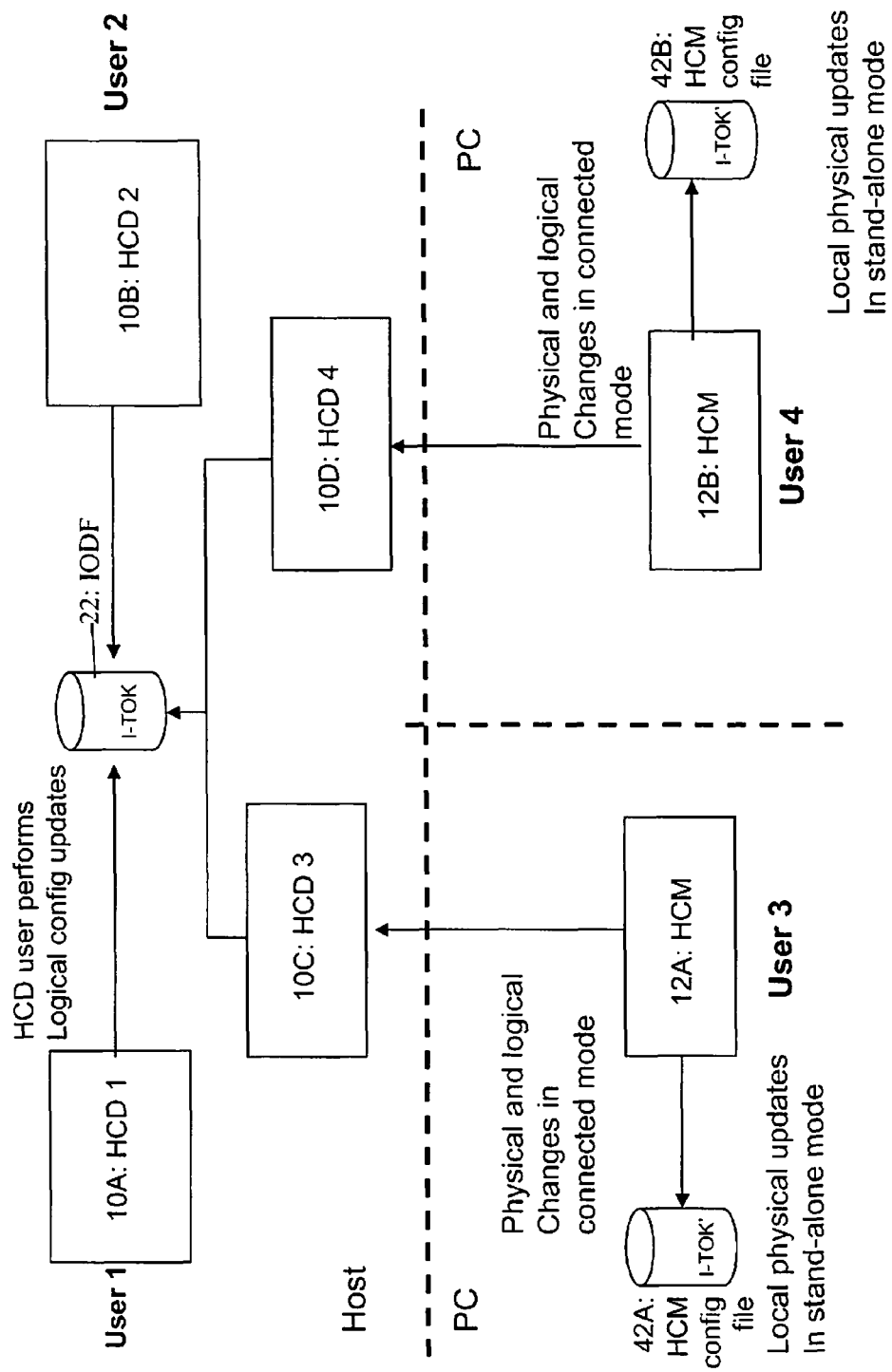

The above-mentioned access method is used in prior art for example in a heterogeneous computing network, wherein the IBM z/OS or z/VM mainframe operating system manages a mainframe hardware, and wherein further hardware like IBM zSeries devices are configured, being installed next to different computers having a different operating system, like Linux, other Unix derivatives, or z/OS, OS/390, z/VM, VSE. With reference now to FIG. 1 which illustrates the structural components of a networked environment according to a prior art IBM mainframe environment, the present invention can be applied.

In this environment, in a concrete exemplary implementation in IBM mainframe technology a particular mainframe application denoted HCD (Hardware Configuration Definition) is occupied with the configuration of the hardware being implemented in this heterogeneous network. The HCD application runs on several user sessions on one or more hosts 10A, 10B, etc., and performs the logical configuration, as the hardware alone used in this heterogeneous network is not self-explanatory enough in order to describe a full and complete description of all aspects which must be defined in order to guarantee a proper operation of the hardware in the daily use. For example access rights defining particular systems and path information particular or other hardware being accessible by these systems are typical logical items of a logical configuration part which is subject to a fine-granular management by the HCD-application.

All those logical hardware definitions are saved in a centralised location in a particular file 22 denoted herein as IODF, which is an abbreviation for input/output definition file. This IODF 22 is a data repository which has proprietary access methods and data structures, which are not found in and which are not comparable to prior art database technology, like relational database technology.

With respect to the focus of the invention, in the course of the increasing trend to consolidate data centres, i.e., concentrate the functional operations of several data centers into a single, larger data center and thus to merge several of such I/O configuration repositories like above IODF, there is a growing need for accessing and changing the above-mentioned configuration data in a repository 22, in particular by multiple users.

So, different user groups require accessing the same I/O configuration data at the same time. Examples for those user groups are system programmers, hardware planner staff and cabling staff, etc. This repository 22 has a structure which gets referenced via its proprietary external interface (in this case the programs denoted "IOS", "CP" and "ALLOCATION"), which can not be changed without major burden as to costs and staff. Further, it is always quite risky to change a running system by implementing major changes such as a replacement of the above-mentioned IODF 22 by a relational database, which is theoretically, of course possible, but which is not a reasonable alternative, as the number of concurrent users is relatively low, in most systems this is varying between two and six users. Thus, in prior art one decides to do a "pseudo multiple user access" as far as it can be managed by locking the IODF file 22 in case a different user has currently access to it and accepting a certain performance penalty due to this locking.

In the bottom left part of FIG. 1 and in the bottom right part thereof, respective personal computer systems 12 are depicted in order to illustrate that the above-mentioned staff members may have also access to above IODF 22 via such PCs and respective PC applications, denoted here as HCM (Hardware Configuration Manager).

As reveals from the drawing, when a HCM user wants to update the IODF, then he uses a host application 10C or 10 D denoted as HCD3 as a temporary server application. HCM itself is then acting as a client.

During such update of the centralised IODF 22 no other user—be that a different HCM user or another HCD user—may have access to the IODF 22, and not even for a read access.

In this particular environment the HCM application allows to configure even finer details of the hardware configuration, for example the cabling scheme used within the network. In order to manage these physical configuration data which is not shared by other users, a HCM user manages its own configuration file locally and as a separate physical file, in order to be able to perform local, physical updates in a stand-alone mode, first locally at the client's side. When performing a logical update with the centralized IODF 22, the corresponding physical updates are done to the local configuration file.

Such local updates are not made globally valid but reside in the local store of the client. A manual effort is required to provide these local updates to a different HCM client. Sharing of data defining the physical configuration is only possible by exchanging the appropriate HCM configuration file among HCM users, thereby forcing a timely serialisation of update accesses.

Having in mind the above-mentioned problems of merging data centres, a better way to provide a multiple user access to centralised, proprietary datastores 22 and 44 is strongly desired.

1.3. Objectives of the Invention

It is thus an objective of the present invention to provide an improved, cost-effective multiple-user access method in a networked client-server environment to a proprietary data repository not featuring database-type data structures and access methods.

2. SUMMARY AND ADVANTAGES OF THE INVENTION

This objective of the invention is achieved by the features stated in enclosed independent claims. Further advantageous arrangements and embodiments of the invention are set forth in the respective subclaims. Reference should now be made to the appended claims.

According to the broadest aspect of the invention an access method performed in a client-server computing environment to a data repository is disclosed. Preferably, this method is dedicated to an environment, wherein a mainframe acts as a server and a plurality of host applications are the only clients, or in an extended form in which further non-host-applications, e.g. LINUX, PC based applications, etc., act as further, secondary clients via the host applications as primary clients, wherein all clients request access to the repository.

Thus a method for managing the access requested by host applications (HCD1, HCD2, HCD3 . . . ) and, optionally in addition by further client applications (HCM), to a central, non-standard database type data repository (IODF) is disclosed, wherein the data repository has 1) proprietary access methods and
2) proprietary, non-standard database type data structures, and in which data repository the data integrity is controlled and checked by this application, and where from a kind of other "mature" application—like "ALLOCATION, IOS, CP—running independently of the host applications HCD as a part of the host operating system must be able to access the data.

Such application is called "mature", as changes thereon are not desired. This method is characterized by the steps of:
a) performing a first update on the data repository of a first user application in a transactional form, and
b) in case a second user application requests a second update of said repository during the first update transaction,
c) blocking a write access until the first update's transaction has been completed.

The cost-efficiency is obtained due to the fact, that the users need not learn a new application, as the pre-existing applications (here HCD ad HCM) can be further used, and due to the fact, that no separate standard database is used for storing the data.

Preferably, the data is "configuration data" of input/output (I/O) device configurations of the mainframe and/or client server computing environment. Further, a first type data is logical data for describing the configuration of the mainframe and/or client-server environment in terms of logical names and access paths, and a second type data is physical description data, describing the physical hardware configuration used preferably at each client side.

When the method further comprises the steps of:
a) when granting write access to a host or client application, writing an update indicator flag into the data repository,
b) when checking a write access permission, reading the indicator flag,
an advantageous implementation of the multi-user control is provided.

When the method further comprises the steps of providing a read-only copy of the last status of data stored in the data repository to the access-requesting second host or client application after the begin and before the end of the first update transaction,
then a second user having a worse access priority than a first user, may read the data earlier than in prior art.

According to a further preferred feature the non-database data repository stores first-type data, e.g. logical configuration data shared between multiple client or server program applications, and
when multiple clients—for example the above-mentioned HCM application user—generate second-type data, for example physical configuration data being logically dependent of at least a part of the first type data, and
the multiple clients store the second type data within a local storage—further denoted as HCM local configuration file— and each local file is managed separately by each client.

The method is further enriched in this aspect by comprising the steps of:

a) maintaining a master file further denoted as HCM master configuration file, by the server, the master file being linked to the data repository and comprising the total of the second-type data stored by the plurality of clients,
b) performing a first update on the master file of a first user application in a transactional form, and
c) in case a second user application requests a second update of the master file during the first update transaction,
d) blocking a write access until the first update's transaction has been completed.

By that the inventional method is extended to comprise multiple user access also for PC-applications involving second type data which are content-related with first type data managed by HCD applications and/or PC applications.

Further preferably, two different tokens are managed for controlling an update access right to the master file and the data repository:
a) a first token denoted further as PTOK, for identifying consistency or inconsistency between a respective local cache and the master file,
b) a second token further denoted as ITOK, for identifying if or if not the local cache data match the data managed in said data repository. Remark, that in this aspect first type and second type data are content-related. In a specific case, the second type data depends on the first type data.

The use of a master configuration file mastering the physical and logical changes performed in the plurality of different, local client applications (HCM users) allows multiple client users (HCM users) to sequentially access and update the same configuration definition. If desired, even multiple users on the client side and on the server side are allowed to concurrently access and update the same configuration definition.

The present invention thus offers a cost-effective solution to provide multi-user access to host applications which are mature in the sense of "fully grown up and fully developed and which should not be changed".

This is possible as the existing interfaces and operations characteristics are maintained and basically not changed by the inventional method.

According to a preferred feature a user may decide via a flag whether or not the inventional multi-user capability is used.

Thus, the inventional method supports client-server applications with distributed repositories in heterogeneous networks.

3. BRIEF DESCRIPTION OF THE DRAWINGS

Figure 2:
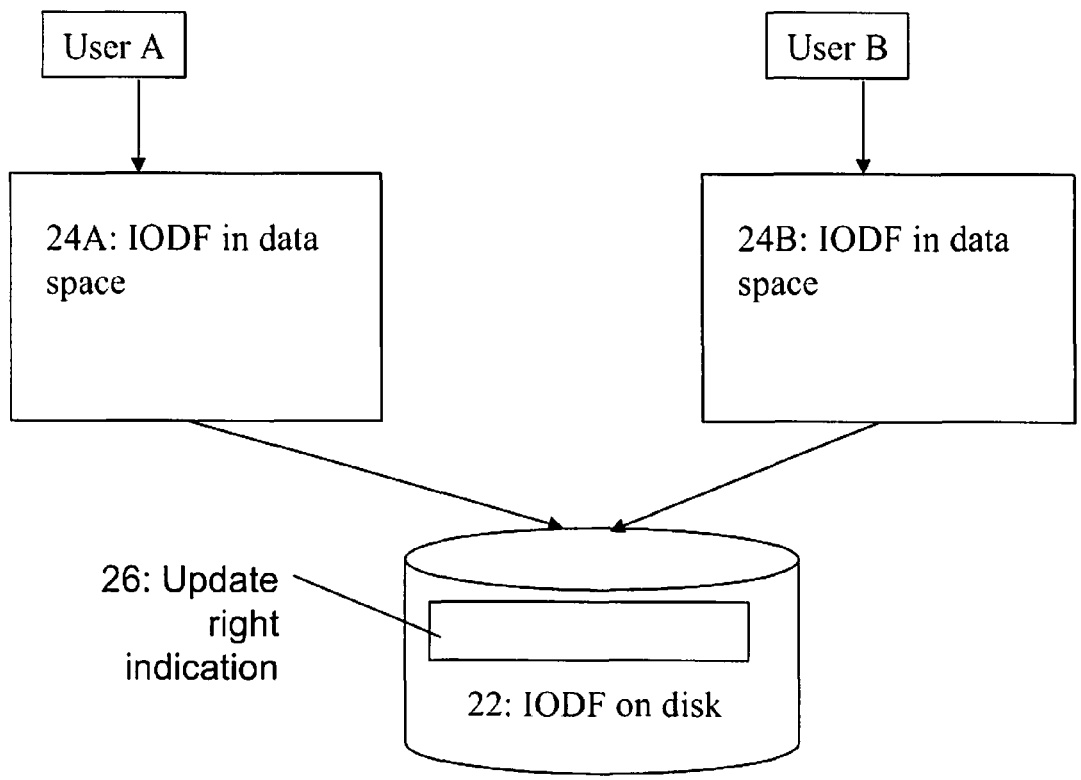
Figure 3:
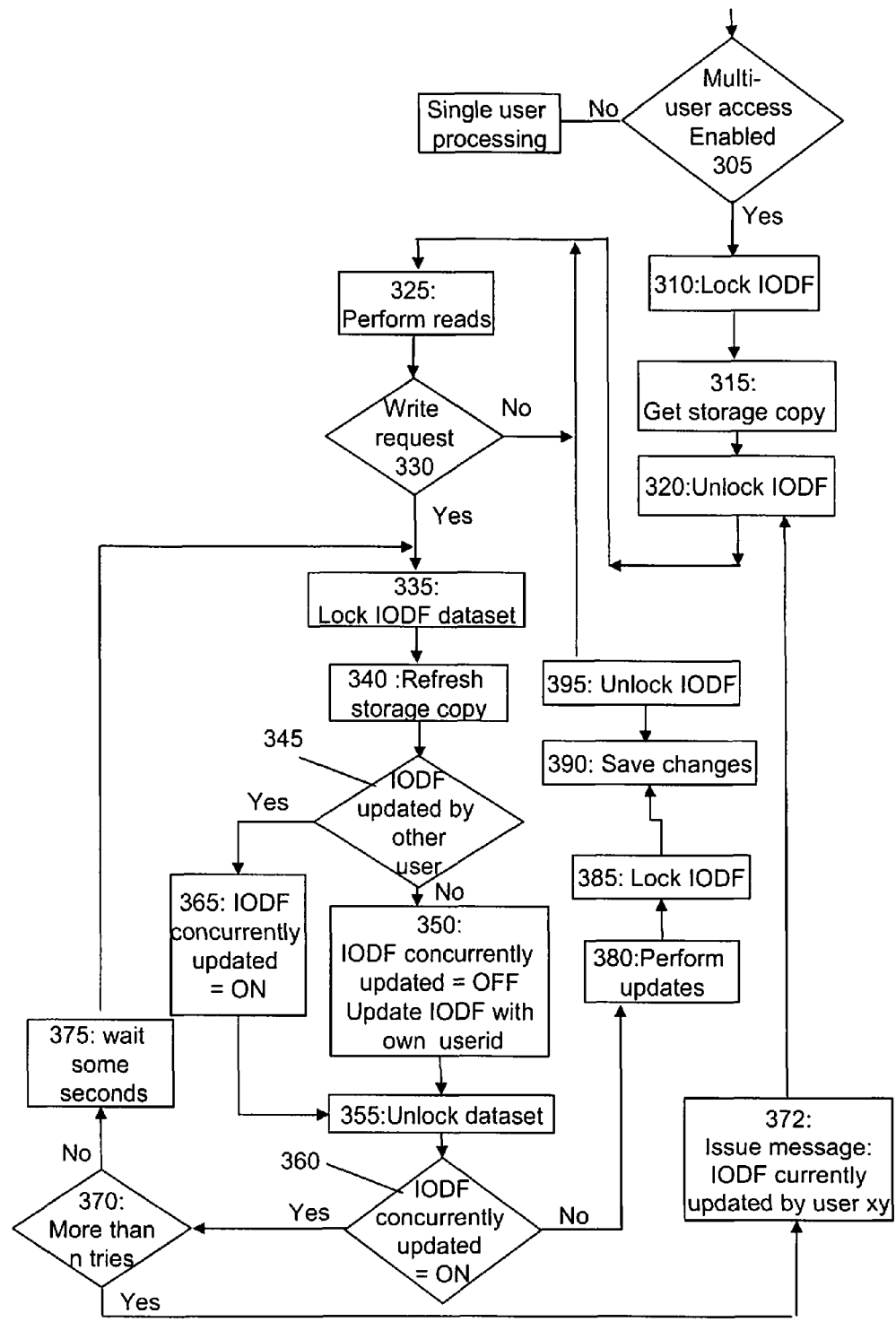
Figure 4:
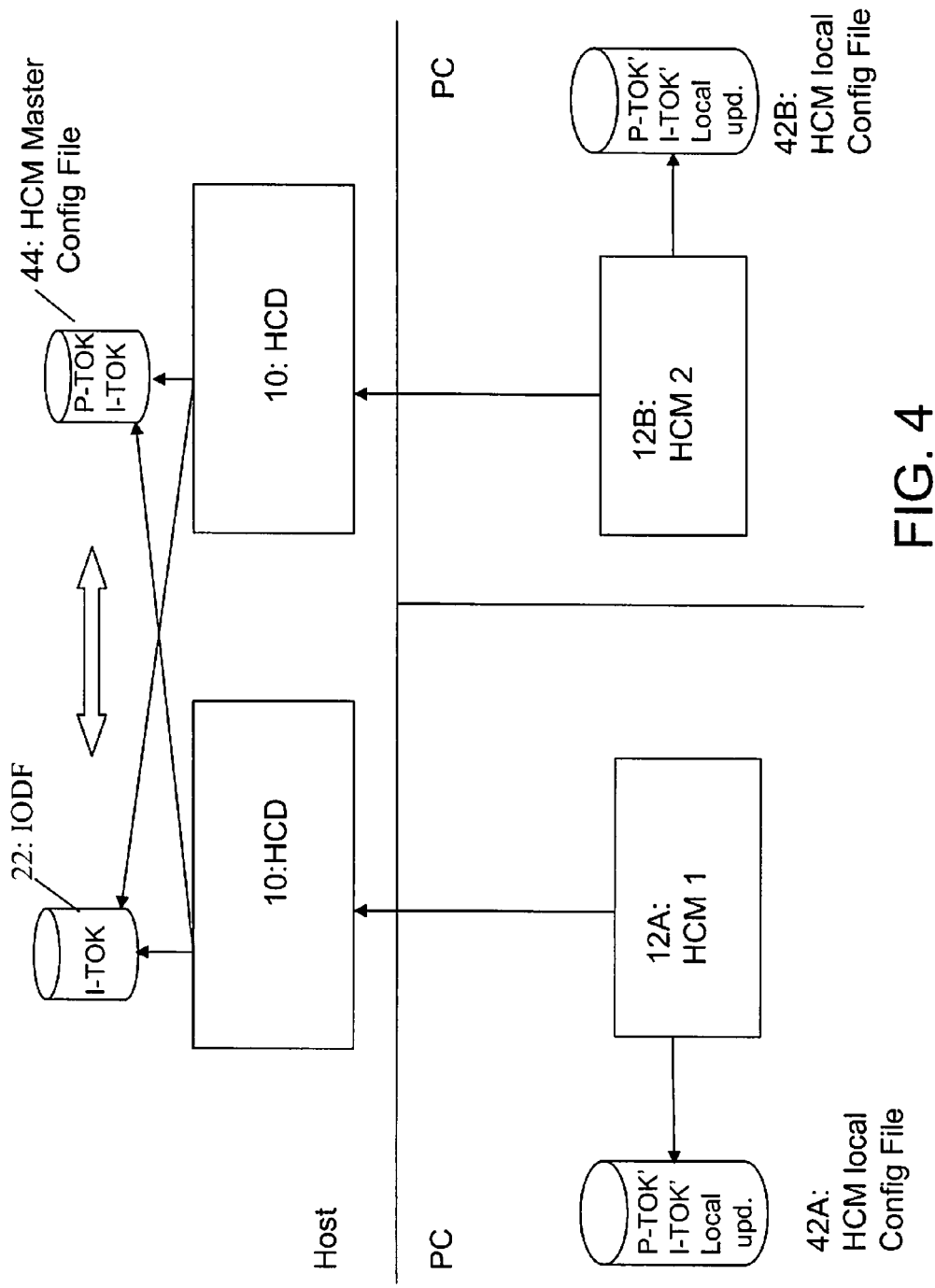
Figure 5:
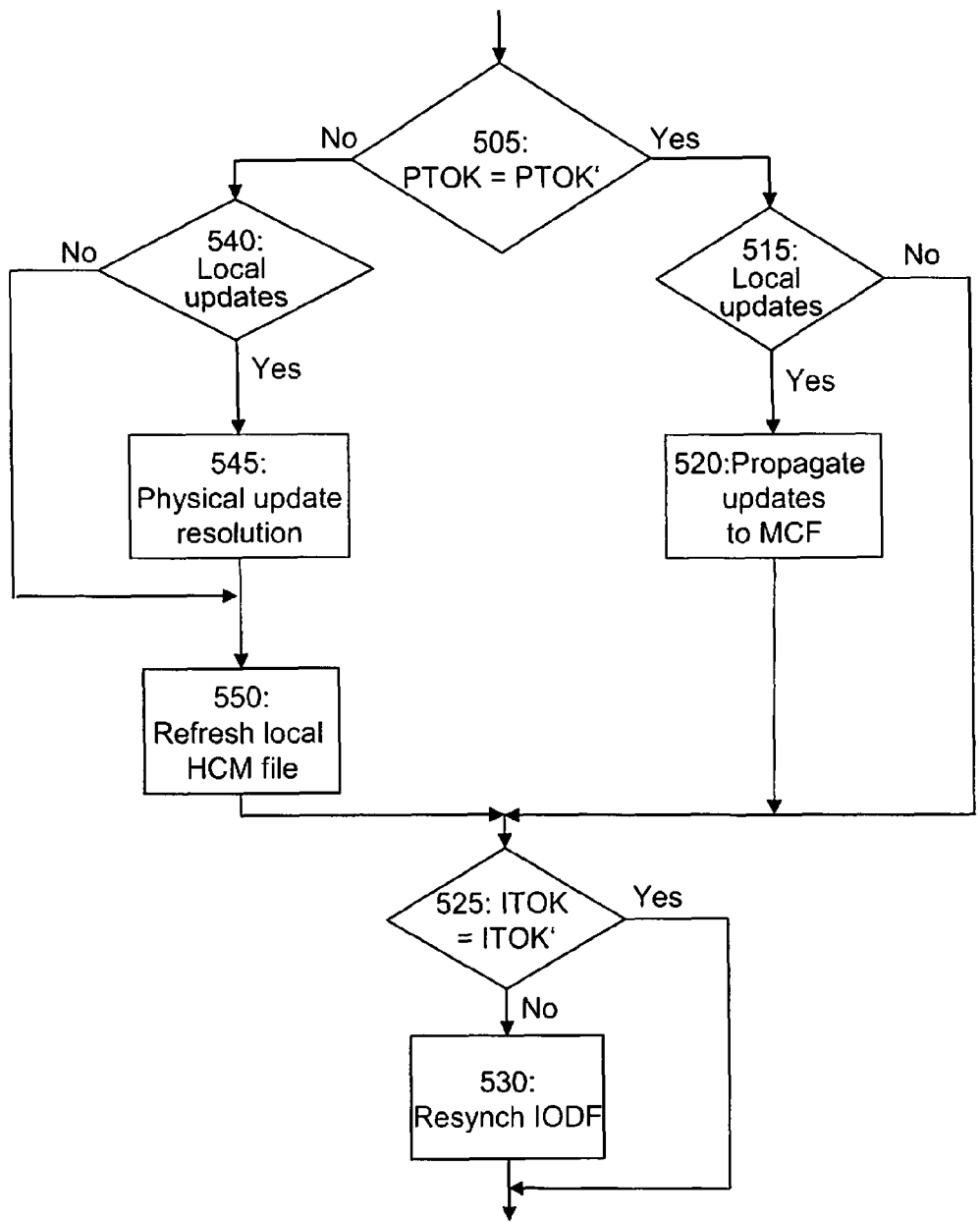

The present invention is illustrated by way of example and is not limited by the shape of the figures of the drawings showing schematic representations in which:

FIG. 1 illustrates structural components of a networked environment according to prior art, in which the present invention can be used, FIG. 2 illustrates structural components of a multi-user access to a single data repository used in the inventional method, FIG. 3 illustrates the major functional components of the control flow used in the inventional method, when updating the single data repository while providing multi-user access, according to FIG. 2, FIG. 4 illustrates structural components in an environment according to FIG. 1, in which an inventional master file is used for keeping a plurality of local files in synchronisation to each other, FIG. 5 is a respective control flow diagram applied in the inventional method, when updating both, the single data repository and the master file, according to FIG. 4, FIG. 6 is a table representation summarising the essential doing of the inventional method in a scenario according to FIGS. 4 and 5.

4. DETAILED DESCRIPTION OF THE PREFERRED EMBODIMENT

The detailed description of the inventional method is done by aid of describing a preferred embodiment thereof implemented in a networked environment including an IBM mainframe and respective mainframe applications HCD, which configure the hardware definition in the network in a logical way, and including PC-implemented applications HCM, which provide, additionally to the logical definition, the physical definition of the hardware configuration in the network, as far as the input/output devices are concerned in the network areas comprising hardware and software other than that of the mainframe type including PCs, Linux workstations and optionally other operating systems.

The physical configuration data managed by HCM applications is content-related to the logical configuration data managed by the HCD or HCM applications. Logical data is stored in the IODF repository, whereas the physical configuration data is stored locally at each HCM application, as well as—implied by the present invention—in a master file, which is also managed at the host side in a close cooperation with the data content of the IODF.

With general reference to the figures and with special reference now to FIG. 2 the inventional method is described in more detail in a preferred embodiment implemented in a heterogeneous, networked environment including mainframe applications (HCD1,2,3,4) acting as user applications and requesting all a write access to a common, shared data repository, here denoted as IODF. The mainframe user applications HCD are depicted exemplarily by user A and user B in FIG. 2.

In more detail and with additional reference to FIG. 3 the inventional method is described, when several HCD applications request a write access to the IODF data repository: The workflow of FIG. 3 is controlled by a HCD application 10, which acts as server as soon as a read or a write request is issued by a client. The client can be for example a host-client HCD application or a distributed PC, or a Linux client HCM application 12.

The data repository is allocated by applying a particular access method, here VSAM with a share option 3,3, in order to allow multi-user access to the IODF. In more detail in a preparative step 305 other multi-user access is enabled. This is done by a simple flag indicator 26. Then the IODF is locked in a step 310. When a HCD application requests a read or write access to the IODF it receives a copy of the IODF loaded into its own memory data space. All update action will first be performed at this storage copy, step 315. For an HCM application the storage copy includes both IODF and HCM master configuration file data. In this context a data consistency token will be checked as described in FIG. 5 later below.

Then IODF is unlocked, step 320 in order to keep the locked time as short as possible.

Then in a step 325 the HCD user application may read any data set currently interesting at its storage copy. Then, in a step 330 the HCD application is assumed to request for a write access to the IODF, see the YES-branch of step 330. Then, in step 335 the IODF data repository is locked in order to avoid that another HCD application performs a concurrent write access. Then in an optional step 340 the storage copy obtained before in step 315 is refreshed in order to present the actual status of the IODF data set. Again, for an HCM application the storage copy includes both IODF and HCM master configuration file data. In this context a data consistency token will be checked as described in FIG. 5 later below.

In a following step 345 the program control reads a particular flag 26, which was already mentioned before, and indicates if, or if not the IODF data repository is concurrently updated by another HCD application. This is done by reading a respective header field of the IODF itself. In the NO-case only one HCD application wants to update the IODF and thus the flag is evaluated to be in the OFF-status.

Now the actual update of the IODF relevant data set is performed by using the user ID of the respective HCD application user. Then in a next step 355, after the update has been completed the data set is unlocked. Then in a step 360 it is checked if the concurrent update indicator flag is set ON or not. In the NO-case of step 360 updates may be performed, see steps 380 to 395, whereas in the YES-case of decision 360 the flag is ON and a concurrent update is currently to be expected. In this case a retry is done after some seconds, see decision 370 in step 375, branching back to step 335. If otherwise a certain, predetermined number of retries have been done without getting a write access to the IODF, in a step 372 a message is issued to the requesting HCD application saying that the IODF is currently under update procedure performed by a different HCD application user.

With reference back to the decision in step 345, in which the inventional program checks if the IODF is currently updated by another user, in the YES-case thereof the update indicator flag is set ON and it is branched to step 355, where the control flow is continued as described already above.

With further reference to the NO-branch of step 360, in which it is decided that there is no concurrent update in progress, then in a step 380 the intended updates are performed on the local storage copy of the HCD application. Then in a step 385 the data repository IODF is locked, the changes of the update step 380 are saved, the concurrent update indicator flag is reset to OFF, and in step 395 the IODF is unlocked again. Then the control is returned in order to expect further update requests.

As a skilled reader may appreciate, the inventional method provides an explicit transactional behaviour by starting a transaction with the lock step 335 and by ending the transaction by the unlock step 395.

After step 395 an optional broadcasting mechanism can be activated in order to inform the current HCD application users about the fact that the data repository was actually updated and may issue a refresh view of the actually updated data in order to send them a refreshed storage copy in analogy to step 315 or step 340.

Next and with reference to FIGS. 4, 5 and 6 the multi-user access provided by the present invention is extended to the physical configuration data maintained in the plurality of HCM local configuration files being maintained by the plurality of HCM applications 42, of which two—42A, 42B—are depicted, HCM1 and HCM2 in the bottom part of FIG. 4 or FIG. 1. Additional to prior art (FIG. 1) according to the invention a HCM master configuration file 44 is maintained at the host side in a close cooperation to the IODF data repository 22, as the content stored in master file 44 is strongly dependent on the content of the IODF 22. There are still local HCM configuration files 42A and 42B residing on the HCM workstations locally, which are further used as a local cache, or alternatively in order to enable a stand-alone operation independently or at least temporarily independently of the IODF 22. According to the invention the current data of the global HCM master configuration file 44 are identified by means of a unique token, which is a "world wide valid unique verifier"

This token is used to check the consistency between local cache and master configuration file. The world wide unique value ensures herein that a new token does not accidentally get the same value as a previous token; otherwise this may lead to an invalid result of the match.

The unique token is stored both in the HCM master configuration file 44 as well as in each of the local HCM configuration files 42. Basically, by comparing those tokens which are denoted in the figures as PTOK, denoting "physical token" the inventional program logic decides if the local cache 42A, 42B must be refreshed or not.

Next and with special reference to FIGS. 5 and 6 the multi-user access provided by the present invention for data repository 22 and HCM master configuration file 44 will be described in more detail.

The workflow of FIG. 5 is controlled by a HCM client application 12. It is run, whenever a storage copy of the configuration data is fetched from IODF 22, which will be the steps 315 and 340 described above.

First and with respect to updating the HCM file 44, in order to receive a write access right the same mechanism is applied as it was described before with reference to steps 310 to 395 in FIG. 3. It should be noted that in a stand-alone mode local changes of the local HCM configuration files 42 are still possible independently of the multi-user access to file 44. For this purpose a "locally-updated" indicator bit is maintained in each of the local files 42 in order to keep this status actual.

Next, the co-operational control flow of the inventional method will be described in more detail when several HCD user applications and several HCM user applications want to concurrently perform an update of IODF 22 and HCM master configuration file 44.

Both of these data sources are managed at the host side. The co-operational control provided by the inventional method is depicted in a control flow in FIG. 5 and is implemented exemplarily by means of two different control tokens which are read when either data source 22 or 44 is opened, or when an update transaction is started. The token relevant for the IODF data source 22 is denoted as ITOK, whereas the token for the HCM master configuration file 44 is denoted as PTOK (physical token).

For each HCM client application that connects to a HCD application, acting as a server in this case, the following processing is done when initially accessing the IODF 22 between steps 320 and 330 and at step 380:

First, the physical token PTOK is evaluated in step 505, later the IODF token ITOK is evaluated in step 525. In step 505, for each HCM client which opens the HCM Master configuration file 44 by using HCD application 10, the PTOKs of files are evaluated and compared. For example, for HCM1 accessing file 44, this file 44 will be compared to HCM local file 42A. For HCM2 this would be local file 42B.

In case the physical token matches, see the YES-branch of decision 505, then the local HCM configuration file 42 of the accessing HCM client is synchronised.

In this case, a next check is performed in step 515 testing if or if not local updates have been performed in a local HCM configuration file 42. In the YES-case thereof the local updates are propagated to the master configuration file 44. After step 520 as well as in the NO-branch of step 515 it is branched forward to step 525 in order to compare the IODF match token ITOK.

With reference to the NO-case of step 505 no match was found between a local PTOK and the PTOK held at the master configuration file 44. This means if one HCM application user has updated its local HCM configuration file 42A, the local cache 42A will be refreshed according to the following scheme: in a decision 540 it is again checked if there is a local update done by a HCM user 42A.

In the YES-case this means another HCM application user has already changed the HCM master file 44 while concurrently local updates have also been done. In this case in a step 545 a physical configuration data update resolution dialog is started in order to solve potential conflicts. After solving all conflicts the local HCM file 42 is refreshed by the actual version of the resolved HCM master file 44. In the NO-case of 540 no resolution dialog is necessary. In this case the IODF data is in synchronisation, the master HCM file has some additional physical updates, and the local HCM file 42 is refreshed in step 550. Then it is branched forward to decision 525, deciding if or if not the IODF token matches. In case the ITOK tokens do match, nothing special must be done, whereas in case the ITOK tokens do not match, a resynchronisation must be performed in order to get the IODF data consistent with the HCM configuration file. The resynchronisation is performed such that the data of the physical connections are adapted to the data of the logical connections of the IODF without user intervention. This is done according to prior art.

Different administration persons, administrating respective different local HCM files 12A and 12B, need only agree on that subset of conflicting physical configuration data which is to be transferred into the HCM master configuration file 44.

A person skilled in the art may appreciate that several HCD application users may concurrently request read access or write access to the shared data source 22 (IODF). Data integrity of read or write operations is provided by a locking mechanism. The gating for the updates is for the duration of a transaction only. A lock is only active for a small time range in which the update indicator is written into the IODF or removed therefrom.

The present invention can be realized in hardware, software, or a combination of hardware and software. A hardware configuration tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation;
b) reproduction in a different material form.

The invention claimed is:

1. A method performed in a client-server computing environment for managing the access requested by client applications to a central, non-standard database type data repository having proprietary access and data structures performed by a further server application, comprising:
- a) performing a first update on said data repository of a first client application in a transactional form, and
- b) in case a second client application requests a second update of said repository during said first update transaction,
- c) blocking a write access until said first update's transaction has been completed, wherein said non-standard database data repository stores first-type data shared between multiple host program applications, and wherein the client applications generate second-type data being logically dependent of at least a part of said first-type data, and store said second type data within a local storage managed separately by each client application, comprising maintaining a master file by said server, the master file being linked to said data repository and comprising the total of said second-type data stored by the client applications, performing a first update on said master file of a first client application in a transactional form, in case a second client application requests a second update of said master file during said first update transaction, blocking a write access until said first update's transaction on said master file has been completed, wherein two different tokens are managed for controlling an update access right to said master file and said data repository: a first unique token that identifies consistency or inconsistency between said local cache and said master file and a second unique token that identifies if or if not the local cache data match the data managed in said data repository, wherein the first unique token of the master file is compared to the first unique token of a local file, and wherein the second unique token of the local cache data is compared to the second unique token of the data repository.

2. The method according to claim 1, wherein the server is implemented by a mainframe computer acting as a host for several client applications.

3. The method according to claim 2, wherein said further server application performing the access is a part of the mainframe operating system.

4. The method according to claim 2, further comprising:
- a) when granting write access to a host application, writing an update indicator flag into said data repository,
- b) when checking a write access permission, reading said indicator flag.

5. The method according to claim 1, further comprising:
providing a read-only copy of the last status of data stored in said data repository to said access-requesting second host application after begin and before the end of said first update transaction.

6. The method according to claim 1, wherein said data is configuration data of input/output (I/O) device configurations of said client-server computing environment, and said first type data is logical data for describing the configuration of the client-server environment in terms of logical names and access paths, and said second type data is physical description data, describing the hardware configuration used at each client side.

7. A computer system, comprising a combination of hardware and software, implemented in a client-server computing environment for managing the access requested by client applications to a central, non-standard database type data repository having proprietary access and data structures performed by a further server application,
wherein said server is implemented by a mainframe computer acting as a host for several host applications, the computer system implementing a functional component for:
performing a first update on said data repository of a first client application in a transactional form,
in case a second client application requests a second update of said repository during said first update transaction, and
blocking a write access until said first update's transaction has been completed, wherein said non-standard database data repository stores first-type data shared between multiple host program applications, and wherein the client applications generate second-type data being logically dependent of at least a part of said first-type data, and store said second type data within a local storage managed separately by each client application, comprising maintaining a master file by said server, the master file being linked to said data repository and comprising the total of said second-type data stored by the client applications, performing a first update on said master file of a first client application in a transactional form, in case a second client application requests a second update of said master file during said first update transaction, blocking a write access until said first update's transaction on said master file has been completed, wherein two different tokens are managed for controlling an update access right to said master file and said data repository: a first unique token that identifies consistency or inconsistency between said local cache and said master file and a second unique token that identifies if or if not the local cache data match the data managed in said data repository, wherein the first unique token of the master file is compared to the first unique token of a local file, and wherein the second unique token of the local cache data is compared to the second unique token of the data repository.

8. A non-transitory data processing system that stores a computer program, wherein the non-transitory data processing system is implemented in a client-server computing environment for managing the access requested by client applications to a central, non-standard database type data repository having proprietary access and data structures performed by a further server application, wherein said server is implemented by a mainframe computer acting as a host for several host applications, the computer program having a functional component for:
performing a first update on said data repository of a first client application in a transactional form,
in case a second client application requests a second update of said repository during said first update transaction, and
blocking a write access until said first update's transaction has been completed, wherein said non-standard database data repository stores first-type data shared between multiple host program applications, and wherein the client applications generate second-type data being logically dependent of at least a part of said first-type data, and store said second type data within a local storage managed separately by each client application, comprising maintaining a master file by said server, the master file being linked to said data repository and comprising the total of said second-type data stored by the client applications, performing a first update on said master file of a first client application in a transactional form, in case a second client application requests a second update of said master file during said first update transaction, blocking a write access until said first update's transaction on said master file has been completed, wherein two different tokens are managed for controlling an update access right to said master file and said data repository: a first unique token that identifies consistency or inconsistency between said local cache and said master file and a second unique token that identifies if or if not the local cache data match the data managed in said data repository, wherein the first unique token of the master file is compared to the first unique token of a local file, and wherein the second unique token of the local cache data is compared to the second unique token of the data repository.

9. A non-transitory computer usable storage medium that stores a computer program product comprising computer readable program means for causing a computer to perform the method of claim 1, when said computer program product is executed on a computer.

\* \* \* \* \*